United States Patent
Park et al.

(10) Patent No.: US 12,323,507 B2
(45) Date of Patent: Jun. 3, 2025

(54) METHOD AND APPARATUS FOR HARDWARE-BASED ACCELERATED ARITHMETIC OPERATION ON HOMOMORPHICALLY ENCRYPTED MESSAGE

(71) Applicant: ELECTRONICS AND TELECOMMUNICATIONS RESEARCH INSTITUTE, Daejeon (KR)

(72) Inventors: Seong Cheon Park, Daejeon (KR); Hyun Woo Kim, Daejeon (KR); Jung Chan Na, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 359 days.

(21) Appl. No.: 17/954,029

(22) Filed: Sep. 27, 2022

(65) Prior Publication Data

US 2023/0163945 A1    May 25, 2023

(30) Foreign Application Priority Data

Nov. 24, 2021  (KR) .................. 10-2021-0163684
Apr. 12, 2022  (KR) .................. 10-2022-0045015

(51) Int. Cl.
*H04L 9/00*    (2022.01)
*G06F 7/487*    (2006.01)
*H04L 9/06*    (2006.01)

(52) U.S. Cl.
CPC ............ *H04L 9/008* (2013.01); *G06F 7/4876* (2013.01); *H04L 9/0618* (2013.01)

(58) Field of Classification Search
CPC ...... H04L 9/008; H04L 9/0618; G06F 7/4847
See application file for complete search history.

(56) References Cited

U.S. PATENT DOCUMENTS 9,331,851 B2 *  5/2016  Youn ................. H04L 9/008
9,374,220 B2    6/2016  Youn et al.
(Continued)

FOREIGN PATENT DOCUMENTS

| KR | 20150091691 A | 8/2015 |
|---|---|---|
| KR | 1020210067961 A | 6/2021 |
| KR | 20210128303 A | 10/2021 |

*Primary Examiner* — Jason Chiang
(74) *Attorney, Agent, or Firm* — Rabin & Berdo, P.C.

(57) ABSTRACT

Provided are a method and apparatus for a hardware-based accelerated arithmetic operation on homomorphically encrypted messages. The method of performing hardware-based modular multiplication on homomorphically encrypted messages according to the present invention includes receiving a plurality of homomorphically encrypted messages expressed in a polynomial form and a modulus for modular multiplication, decomposing the modulus into a product of a plurality of disjoint factors through CRT operation, and extracting a divided ciphertext from a plurality of homomorphically encrypted messages based on each of the disjoint factors, performing NTT transformation on each coefficient of the divided ciphertext, performing a pointwise multiplication operation between result values of the NTT transformation, performing INTT transformation on a result value of the pointwise multiplication operation to obtain the divided ciphertext, and merging the divided ciphertext obtained in the performing of the INTT transformation through ICRT operation to generate an output ciphertext.

17 Claims, 10 Drawing Sheets

(56) References Cited

U.S. PATENT DOCUMENTS

| | | | |
|---|---|---|---|
| 9,942,039 B1* | 4/2018 | Gutoski | G06F 5/00 |
| 11,296,861 B1* | 4/2022 | Zhang | H04L 9/3033 |
| 2004/0125949 A1* | 7/2004 | Seifert | H04L 9/0861 |
| | | | 380/30 |
| 2015/0237020 A1* | 8/2015 | Rohloff | H04L 63/0428 |
| | | | 713/168 |
| 2019/0363871 A1* | 11/2019 | Cheon | H04L 9/304 |
| 2019/0386814 A1* | 12/2019 | Ahmed | H04L 9/008 |
| 2020/0265167 A1* | 8/2020 | Banerjee | H04L 9/0631 |
| 2020/0374103 A1* | 11/2020 | Cheon | G06F 7/722 |
| 2021/0318869 A1* | 10/2021 | Cathebras | G06F 17/144 |
| 2022/0006611 A1* | 1/2022 | Ghosh | H04L 9/003 |
| 2022/0014351 A1 | 1/2022 | Jung et al. | |
| 2022/0094517 A1* | 3/2022 | Ghosh | H04L 9/008 |
| 2022/0116198 A1* | 4/2022 | Na | H04L 9/3093 |
| 2023/0140257 A1* | 5/2023 | Boemer | G06F 9/30145 |
| | | | 712/208 |
| 2024/0064000 A1* | 2/2024 | Koskas | H04L 9/008 |
| 2024/0235809 A1* | 7/2024 | Cheon | H04L 9/08 |

* cited by examiner

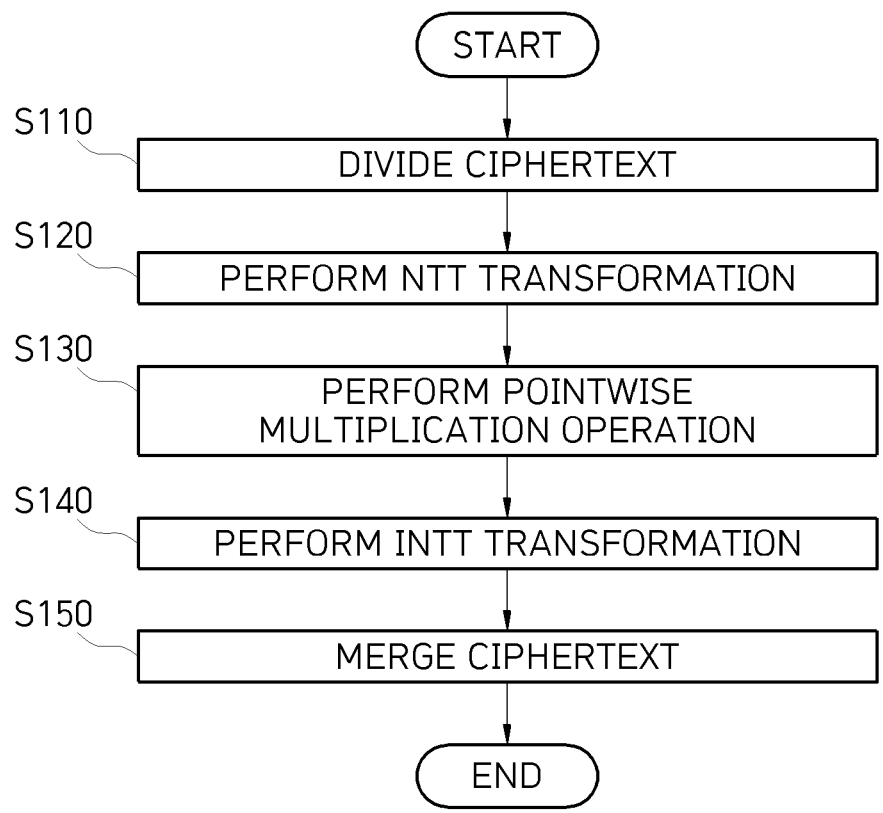

METHOD AND APPARATUS FOR HARDWARE-BASED ACCELERATED ARITHMETIC OPERATION ON HOMOMORPHICALLY ENCRYPTED MESSAGE

CROSS-REFERENCE TO RELATED APPLICATION

This application claims priority to and the benefit of Korean Patent Applications No. 10-2021-0163684, filed on Nov. 24, 2021, and No. 10-2022-0045015, filed on Apr. 12, 2022, the disclosures of which are incorporated herein by reference in its entirety.

BACKGROUND

1. Field of the Invention

The present invention relates to a method and apparatus for a hardware-based accelerated arithmetic operation for reducing the time required for an operation on homomorphically encrypted messages.

2. Discussion of Related Art

Homomorphic encryption technology is the same as other encryption technologies in that data (plaintext) is encrypted to generate ciphertext, but unlike other encryption technologies, may have the characteristic that it may perform an operation on encrypted ciphertext without decrypting the encrypted ciphertext. Due to this characteristic, the homomorphic encryption technology requires a large amount of computation, and thus, has a problem in that an operation processing speed is slow. This problem is an obstacle to the practical use of the homomorphic encryption technology.

The homomorphic encryption technology has the characteristic that it may perform the homomorphic operation without decrypting the ciphertext, and it takes a long processing time to obtain the operation result by performing the homomorphic operation on the ciphertext. To reduce this problem, methods of increasing an operation speed are being studied. As a representative method, there is a method of using a mathematically efficient calculation algorithm for arithmetic operations between polynomials since ciphertext is a polynomial. Nevertheless, the homomorphic operation process has a limitation in that it requires a long processing time.

SUMMARY OF THE INVENTION

The present invention is directed to providing a method and apparatus for a hardware-based accelerated arithmetic operation on homomorphically encrypted messages capable of reducing the operation processing time of a homomorphically encrypted message by introducing a hardware-based parallel operation processing technique.

An aspect of the present invention is not limited to the above-mentioned aspect. That is, other aspects that are not mentioned may be clearly understood by those skilled in the art from the following specification.

According to an aspect of the present invention, there is provided a method of performing hardware-based modular multiplication on homomorphically encrypted messages, including: performing a ciphertext division operation of receiving a plurality of homomorphically encrypted messages expressed in a polynomial form and a modulus for modular multiplication, decomposing the modulus into a product of a plurality of disjoint factors through a Chinese remainder theorem (CRT) operation, and extracting a divided ciphertext from a plurality of homomorphically encrypted messages based on each of the disjoint factors; performing number theoretic transform (NTT) transformation on each coefficient of the divided ciphertext; performing a pointwise multiplication operation between result values of the NTT transformation; performing inverse number theoretic transform (INTT) transformation on a result value of the pointwise multiplication operation to obtain the divided ciphertext; and merging the divided ciphertext obtained in the performing of the INTT transformation through an inverse Chinese remainder theorem (ICRT) operation to generate an output ciphertext.

The performing of the ciphertext division operation may include extracting the divided ciphertext from the plurality of homomorphically encrypted messages through a modulus operation with each coefficient of the homomorphically encrypted message as a first operand and the disjoint factor as a second operand.

The performing of the ciphertext division operation may include extracting the divided ciphertext by performing the modulus operation after applying a sequence of the same disjoint factor to each of the homomorphically encrypted messages.

The performing of the ciphertext division operation may include decomposing the modulus into a product of disjoint factors less than or equal to a predetermined word size.

The performing of the NTT transformation may include performing the NTT transformation on each coefficient of the divided ciphertext after inputting each coefficient of the divided ciphertext to a CT butterfly.

The CT butterfly may determine the number of input terminals based on a highest order of the homomorphically encrypted message.

The CT butterfly may determine the number of calculation stages based on a highest order of the homomorphically encrypted message.

The performing of the pointwise multiplication operation may include performing a pointwise multiplication operation for each disjoint factor by the same order using result values of all NTT transformation obtained in the performing of the NTT transformation as a target.

The performing of the NTT transformation may include inputting a result value of the pointwise multiplication operation to a Gentleman-Sande (GS) butterfly to perform the INTT transformation.

The GS butterfly may determine the number of calculation stages based on a highest order of the homomorphically encrypted message.

According to another aspect of the present invention, there is provided, a homomorphically encrypted message modular multiplier, including: a CRT logic circuit unit configured to receive a plurality of homomorphically encrypted messages expressed in a polynomial form and a modulus for modular multiplication, decompose the modulus into a product of a plurality of disjoint factors through a CRT operation, and extract a divided ciphertext from the plurality of homomorphically encrypted messages based on each of the disjoint factors; an NTT logic circuit unit configured to perform NTT transformation on each coefficient of the divided ciphertext; a pointwise multiplication unit configured to perform a pointwise multiplication operation between result values of the NTT transformation; an INTT logic circuit unit configured to perform INTT transformation on a result value of the pointwise multiplication operation to obtain the divided ciphertext; and an ICRT logic circuit unit configured to merge the divided ciphertext obtained by the INTT transformation through an ICRT operation to generate an output ciphertext.

The CRT logic circuit unit may decompose the modulus into a product of disjoint factors less than or equal to a predetermined word size.

The NTT logic circuit unit may perform the NTT transformation on each coefficient of the divided ciphertext after inputting each coefficient of the divided ciphertext to a Cooley-Turkey (CT) butterfly.

The CT butterfly may determine the number of input terminals based on a highest order of the homomorphically encrypted message.

The CT butterfly may determine the number of calculation stages based on a highest order of the homomorphically encrypted message.

The pointwise multiplication unit may perform a pointwise multiplication operation for each disjoint factor by the same order using result values of all NTT transformation derived from the plurality of homomorphically encrypted messages as a target.

The INTT logic circuit unit may input a result value of the pointwise multiplication operation to a Gentleman-Sande (GS) butterfly to perform the INTT transformation.

The GS butterfly may determine the number of calculation stages based on a highest order of the homomorphically encrypted message.

According to still another aspect of the present invention, there is provided, a homomorphically encrypted message modular multiplier, including: a CRT logic circuit unit configured to receive a plurality of homomorphically encrypted messages expressed in a polynomial form and a modulus for modular multiplication, decompose the modulus into a product of a plurality of disjoint factors through a CRT operation, and extract a divided ciphertext from the plurality of homomorphically encrypted messages based on each of the disjoint factors; an NTT logic circuit unit configured to perform NTT transformation on each coefficient of the divided ciphertext; and a pointwise multiplication unit configured to perform a pointwise multiplication operation between result values of the NTT transformation, in which the NTT logic circuit unit may perform INTT transformation on result values of the pointwise multiplication operation to obtain the divided ciphertext, and the CRT logic circuit unit may merge the divided ciphertext obtained by the INTT transformation through an ICRT operation to generate an output ciphertext.

The CRT logic circuit unit may decompose the modulus into a product of disjoint factors less than or equal to a predetermined word size.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which:

FIG. 1 is a flowchart for describing a method of performing hardware-based modular multiplication on homomorphically encrypted messages according to an embodiment of the present invention;

DETAILED DESCRIPTION OF EXEMPLARY EMBODIMENTS

Figure 2A:
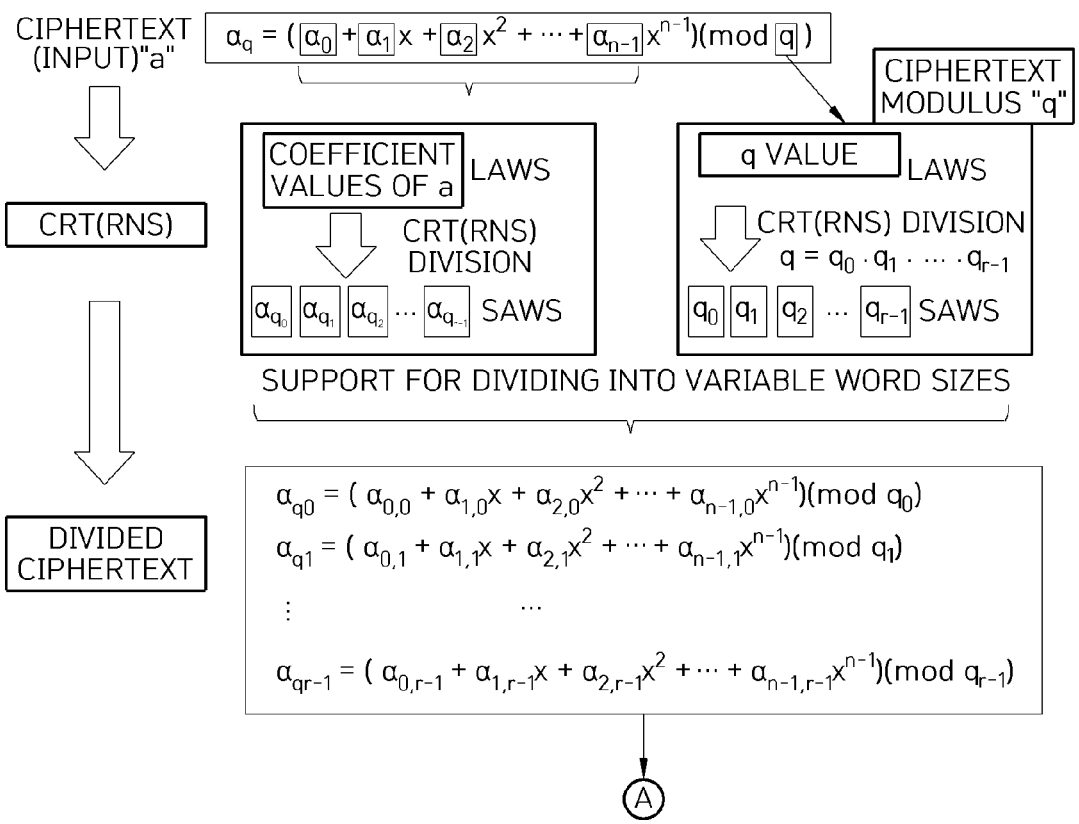
FIGS. 2A to 2F are reference diagrams for operations of each operation of the method of performing hardware-based modular multiplication on homomorphically encrypted messages according to the embodiment of the present invention.

Various advantages and features of the present invention and methods accomplishing them will become apparent from the following description of embodiments with reference to the accompanying drawings. However, the present invention is not limited to embodiments to be described below, but may be implemented in various different forms, these embodiments will be provided only in order to make the present invention complete and allow those skilled in the art to completely recognize the scope of the present invention, and the present invention will be defined by the scope of the claims. Meanwhile, terms used in the present specification are for describing embodiments rather than limiting the present invention. Unless otherwise stated, a singular form includes a plural form in the present specification. "Comprise" and/or "comprising" used in the present invention indicate(s) the presence of stated components, steps, operations, and/or elements but do(es) not exclude the presence or addition of one or more other components, steps, operations, and/or elements.

When it is decided that the detailed description of the known art related to the present invention may unnecessary obscure the gist of the present invention, a detailed description thereof will be omitted.

Hereinafter, embodiments of the present invention will be described in detail with reference to the accompanying drawings. The same means will be denoted by the same reference numerals throughout the accompanying drawings in order to facilitate the general understanding of the present invention in describing the present invention.

FIG. 1 is a flowchart for describing a method of performing hardware-based modular multiplication on homomorphically encrypted messages according to an embodiment of the present invention, and FIGS. 2A to 2F are reference diagrams for operations of each operation of the method of performing hardware-based modular multiplication on homomorphically encrypted messages according to the embodiment of the present invention.

The method of performing hardware-based modular multiplication on homomorphically encrypted messages according to the embodiment of the present invention includes operations S110 to S150.

Operation S110 is a ciphertext division operation. A homomorphically encrypted message modular multiplier according to the present invention (hereinafter, "homomorphically encrypted message modular multiplier") receives a modulus q to be applied to a modular multiplication operation and a plurality of homomorphically encrypted messages targeted for a multiplication operation. In this case, it is assumed that the homomorphically encrypted message is expressed in a polynomial form. The homomorphically encrypted message modular multiplier decomposes the modulus q into a product of a plurality of disjoint factors (pairwise coprime) through a Chinese remainder theorem (CRT) operation, and extracts a divided ciphertext for each homomorphically encrypted message through the modulus operation with each coefficient of the homomorphically encrypted message expressed in a polynomial form as a first operand and a disjoint factor obtained through the CRT operation as a second operand. The extraction of the divided ciphertext is performed according to a certain order of disjoint factors.

Operation S110 will be described below in detail with reference to FIGS. 2A and 2B. In the present embodiment, it is assumed that there are two homomorphically encrypted messages a and b input to the homomorphically encrypted message modular multiplier. The homomorphically encrypted messages a and b each have a highest order (n−1). It may be expressed as a polynomial (Equations 1 and 2) having n terms.

$$a = a_0 + a_1 x + a_2 x^2 + \ldots + a_{n-1} x^{n-1} \quad \text{[Equation 1]}$$

$$b = b_0 + b_1 x + b_2 x^2 + \ldots + b_{n-1} x^{n-1} \quad \text{[Equation 2]}$$

In Equation 1, $a_0, a_1, \ldots,$ and $a_{n-1}$ are coefficients of each term of a, and in Equation 2, $b_0, b_1, \ldots,$ and $b_{n-1}$ are coefficients of each term of b. The coefficients of each term of a and b have an integer value, which corresponds to an integer value of the state before being divided by the modulus q.

There is an equation $(a_q = (a_0 + a_1 x + a_2 x^2 + \ldots + a_{n-1} x^{n-1}) \pmod{q})$ related to $a_q$ in FIG. 2A, and the equation means that the modular operation by the modulus q is finally applied to the homomorphically encrypted message a expressed as a polynomial. The equation for $b_q$ of FIG. 2b is also used to mean that the modular operation by the modulus q is finally applied to the homomorphically encrypted message b.

The homomorphically encrypted message modular multiplier divides the modulus q into $q_0, q_1, \ldots,$ and $q_{r-1}$ through the CRT operation. That is, the homomorphically encrypted message modular multiplier extracts a plurality of disjoint factors $q_0, q_1, \ldots,$ and $q_{r-1}$ from the modulus q through the CRT operation. q may be represented by a product of $q_0, q_1, \ldots,$ and $q_{r-1}$, and $q_0, q_1, \ldots,$ and $q_{r-1}$ have a coprime relationship in any pair. Meanwhile, the CRT operation is also referred to as a residue number system (RNS) operation.

The homomorphically encrypted message modular multiplier acquires the divided ciphertext for each homomorphically encrypted message through the modulus operation with each coefficient of the homomorphically encrypted message and the disjoint factors $q_0, q_1, \ldots, q_{r-1}$ extracted through the CRT operation as operands.

For example, the homomorphically encrypted message modular multiplier obtains a divided ciphertext $a_{q0}$ through the modulus operation with each coefficient of the homomorphically encrypted message a and the disjoint factor $q_0$ as operands of the modulus operation. $a_{q0}$ may be expressed as in Equation 3.

$$a_{q_0} = (a_{0,0} + a_{1,0} x + a_{2,0} x^2 + \ldots + a_{n-1,0} x^{n-1}) \pmod{q_0} \quad \text{[Equation 3]}$$

In Equation 3, $a_{0,0}$ is the remainder obtained by dividing a constant term $a_0$ of the homomorphically encrypted message a by $q_0$, and $a_{1,0}$ is the remainder obtained by dividing the coefficient $a_1$ of a first term of the homomorphically encrypted message a by $q_0$. Also, $a_{n-1,0}$ is the remainder obtained by dividing the coefficient $a_{n-1}$ of a $(n-1)^{th}$-order term of the homomorphically encrypted message a by $q_0$. $\pmod{q_0}$ is used to mean that the modular operation by the modulus $q_0$ is finally applied to the divided ciphertext $a_{q0}$ expressed as a polynomial.

In this way, the divided ciphertext for each disjoint factor may be obtained by sequentially applying $q_0$ to $q_{r-1}$ to the modulus operation. As a result, the homomorphically encrypted message modular multiplier may obtain as many divided ciphertexts $(a_{q0}, a_{q1}, \ldots,$ and $a_{qr-1})$ as the number r of disjoint factors for homomorphically encrypted message a (see FIG. 2A).

Figure 2B:
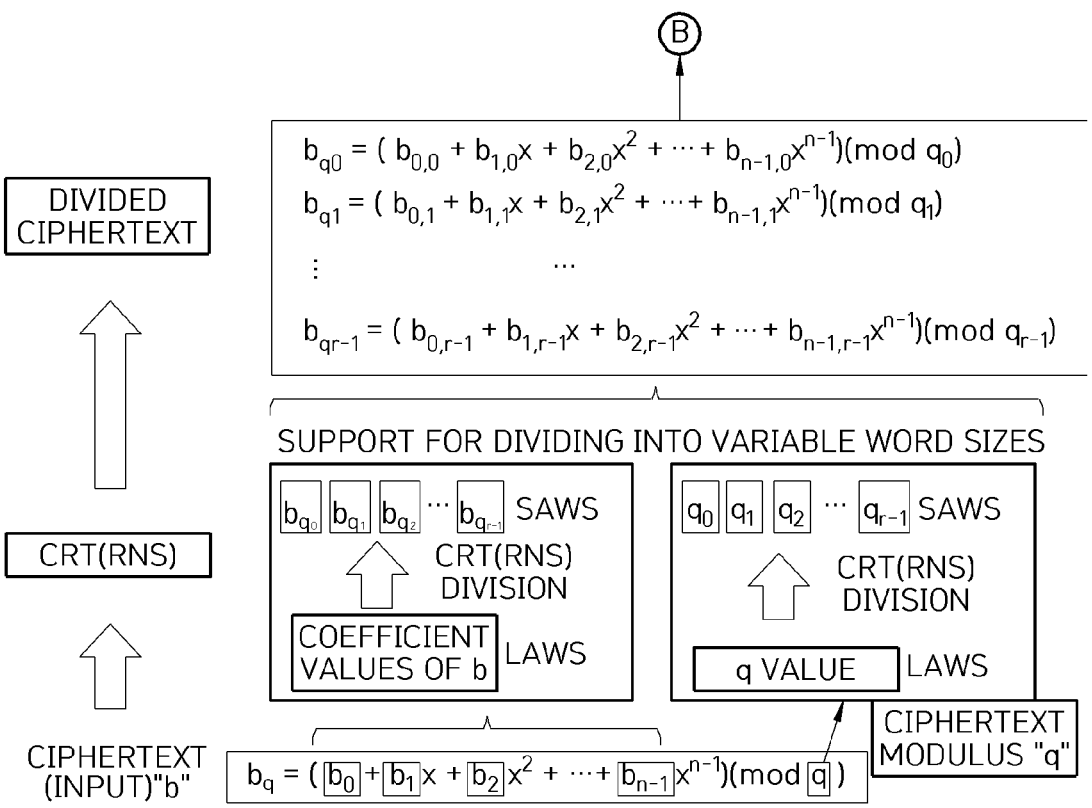

In the same way, even for the homomorphically encrypted message b, the homomorphically encrypted message modular multiplier applies each disjoint factor to the modulus operation in the same order as in the case of homomorphically encrypted message a to obtain as many divided ciphertexts $b_{q0}, b_{q1}, \ldots,$ and $b_{qr-1}$ as the number r of disjoint factors (see FIG. 2B).

Through operation S110, the homomorphically encrypted message modular multiplier may divide each coefficient of the homomorphically encrypted messages a and b having a large arithmetic word size (LAWS) and the modulus q into coefficients ($a_{0,0}$, etc.) having a small arithmetic word size (SAWS) and the modulus ($q_0$, etc.). For reference, the LAWS means a word size that exceeds a default word size (e.g., 64 bits) of a processor, and the SAWS means a word size that is less than or equal to the default word size of the processor.

In the present invention, the coefficients or modulus may be divided into various word sizes using the CRT operation ("support for dividing into variable word sizes" in FIG. 2A). That is, the homomorphically encrypted message modular multiplier may obtain coefficients and a modulus corresponding to variably set word sizes (e.g., 64 bits, 128 bits, 256 bits, 512 bits, etc.) through coefficient/modulus division using the CRT operation. The number r of CRT division may also vary according to the variably set word size, that is, the word size of the targeted coefficient or modulus. The homomorphically encrypted message modular multiplier divides a polynomial having a large coefficient value into polynomials having a coefficient value of a small disjoint factor, and thus, independently processes modular operations in parallel.

Operation S120 is a number theoretic transform (NTT) transformation operation. In the present operation, the homomorphically encrypted message modular multiplier performs NTT transformation on the divided ciphertext for each homomorphically encrypted message. That is, the homomorphically encrypted message modular multiplier performs the NTT transformation on the coefficients of the divided ciphertext obtained in operation S110 to obtain a result value (function value) of the NTT transformation. As the coefficient of the divided ciphertext may be expressed as a sequence, the result value (function value) of the NTT transformation may also be expressed as a sequence.

Operation S120 will be described below in detail with reference to FIGS. 2C and 2D. In the present embodiment, a Cooley-Tukey (CT) butterfly operation is used for the NTT transformation. FIG. 2D illustrates a process in which two output values (u+w*v, u−w*v) are calculated through a CT butterfly operation process when two input values u and v are given. However, since the corresponding NTT transformation is performed on a ring polynomial composed of a modulus q, a modulus operation by q (i.e., mod q) is performed on two output values. FIG. 2D illustrates a process in which the NTT transformation is performed after inputting each coefficient ($a_{0,0}, a_{1,0}, \ldots,$ or $a_{7,0}$) of the divided ciphertext $a_{q0}$ to the CT butterfly when it is assumed that n=8. In the NTT transformation process of the divided ciphertext $a_{q0}$, $q_0$ is applied as the modulus. Looking at a part where $a_{0,0}$ (corresponding to u) and $a_{4,0}$ (corresponding to v) are input in stage 0 of the CT butterfly, it can be seen that $a_{4,0}*w_n^0$ is added to or subtracted from $a_{0,0}$ and then, the result value obtained by performing the modular operation by $q_0$ is an output value of stage 0. In the same way, the output value of stage 0 may be obtained for $(a_{1,0}, a_{5,0})$, $(a_{2,0}, a_{6,0})$, and $(a_{3,0}, a_{7,0})$. When an order n of a polynomial input to the NTT transformation is 8, the NTT transformation is performed through $(\log_2 8)$, that is, three stages (stage 0, stage 1, and stage 2). As a result of the NTT transformation, it is possible to obtain a result value (function value) $A_{q0}$ of NTT transformation composed of $\{A_{0,0}, A_{1,0}, \ldots, A_{7,0}\}$. As described above, the number n of input stages and the number login of stages of the CT butterfly operation may be changed according to the order n of the polynomial of the homomorphically encrypted message.

As described above, the NTT transformation is performed on all divided ciphertexts of homomorphic ciphertexts a and b, so result values $(A_{q0}, \ldots, A_{qr-1}, B_{q0}, \ldots, \text{and } B_{qr-1})$ of the NTT transformation for each divided ciphertext may be obtained.

Meanwhile, even when the polynomial order of the homomorphically encrypted message changes, the NTT transformation in operation S120 may be performed by forming the CT butterfly structure accordingly ("support for variable order" in FIG. 2D). A twiddle factor used in the CT butterfly is composed of n roots of equation $X^n+1=0 \pmod{q}$ as illustrated in FIG. 2D. That is, the twiddle factor is a primitive root of a residual system composed of modulo q, and is obtained by changing parameters and finding a number that satisfies conditions. The twiddle factor is arranged on the CT butterfly according to the NTT algorithm, and is arranged as follows for each stage according to the example of FIG. 2D.

stage 0: Since $w_n^{4k}$ (k=0), $w_n^0$
stage 1: Since $w_n^{2k}$ (k=0,1), $w_n^0$, $w_n^2$
stage 2: Since $w_n^k$ (k=0,1,2,3), $w_n^0$, $w_n^1$, $w_n^2$, $w_n^3$ Operation S130 is an operation of performing a pointwise multiplication operation. In the present operation, the homomorphically encrypted message modular multiplier performs a pointwise multiplication operation between homomorphically encrypted messages. Specifically, the homomorphically encrypted message modular multiplier performs a pointwise multiplication operation according to an order of extracting divided ciphertexts (refer to the description of operation S110) between the result values of the NTT transformation of each divided ciphertext of the homomorphically encrypted messages. The pointwise multiplication operation between the result values of each NTT transformation is an operation to obtain a multiplication result between coefficients of the same order for each same-order term (point-wise). Referring to the embodiment illustrated in FIG. 2C, the homomorphically encrypted message modular multiplier sequentially performs the pointwise multiplication operation between the result values $(A_{q0}, \ldots, \text{and } A_{qr-1})$ of the NTT transformation of the divided ciphertext of the homomorphically encrypted message a and the result values $(B_{q0}, \ldots, \text{and } B_{qr-1})$ of the NTT transformation of the divided ciphertext of the homomorphically encrypted message b according to the order of extracting the ciphertexts (an order of disjoint factors) to obtain result values $(C_{q0}, C_{q1}, \ldots, \text{and } C_{qr-1})$ of the pointwise multiplication operation. For example, $C_{q0}$ is the result of the pointwise multiplication operation of $A_{q0}$ and $B_{q0}$, and $C_{qr-1}$ is the result of the pointwise multiplication operation of $A_{qr-1}$ and $B_{qr-1}$. $C_{0,0}$, which is one of the components of $C_{q0}$, is a product of $A_{0,0}$ and $B_{0,0}$. Each result value of the pointwise multiplication operation may be expressed as a sequence.

As a different example from the present embodiment, when three homomorphically encrypted messages k, l, and m are input to the homomorphically encrypted message modular multiplier, the homomorphically encrypted message modular multiplier performs the ciphertext division (CRT operation) and the NTT transformation to obtain the result values of the NTT transformation for each of the three homomorphically encrypted messages, and then, performs the pointwise multiplication operation between a result value of NTT transformation of a divided ciphertext of homomorphically encrypted message k and a result value of NTT transformation of a divided ciphertext of homomorphically encrypted message l and additionally performs a pointwise multiplication operation between the result value of the operation and a result value of NTT transformation of a divided ciphertext of homomorphically encrypted message m, thereby obtaining a final result value of the pointwise multiplication operation. That is, the homomorphically encrypted message modular multiplier repeatedly performs the pointwise multiplication operation on all result values of NTT transformation of a plurality of homomorphically encrypted messages until one final result value of the pointwise multiplication operation is obtained.

The homomorphically encrypted message modular multiplier according to the present invention may process the computational complexity required for the multiplication operation between $n^{th}$-order polynomials with the number of times of multiplications at an O (n log n) level by the NTT transformation and the pointwise multiplication operation.

Operation S140 is an INTT transformation operation. In the present operation, the homomorphically encrypted message modular multiplier obtains the divided ciphertext by performing the INTT transformation on the final result value of the pointwise multiplication operation obtained in operation S130.

Figure 2C:
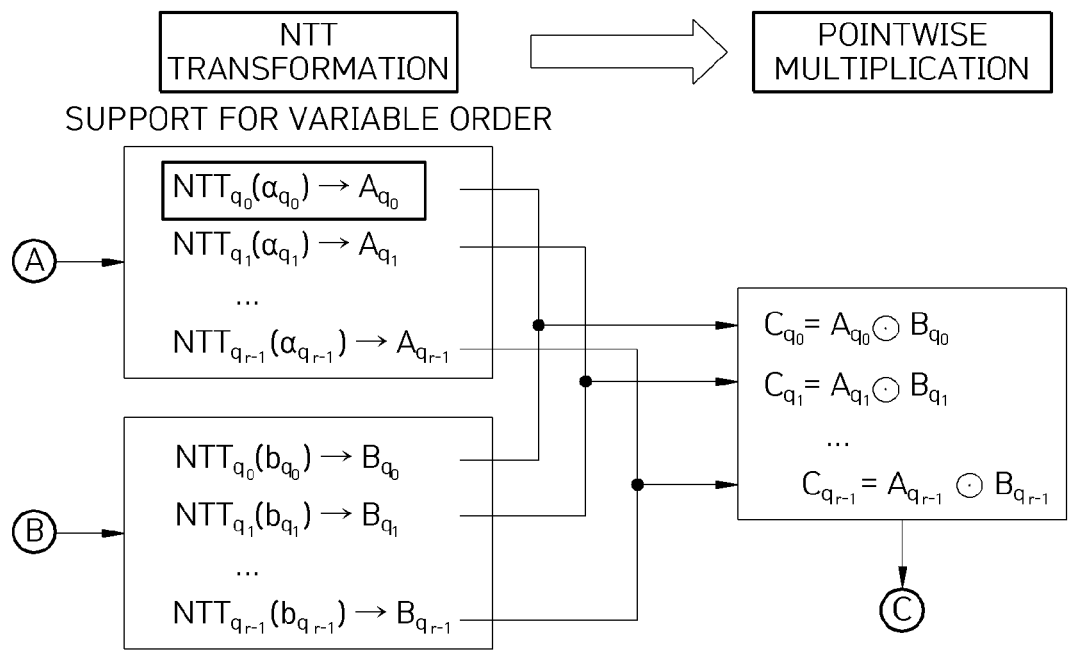
Figure 2D:
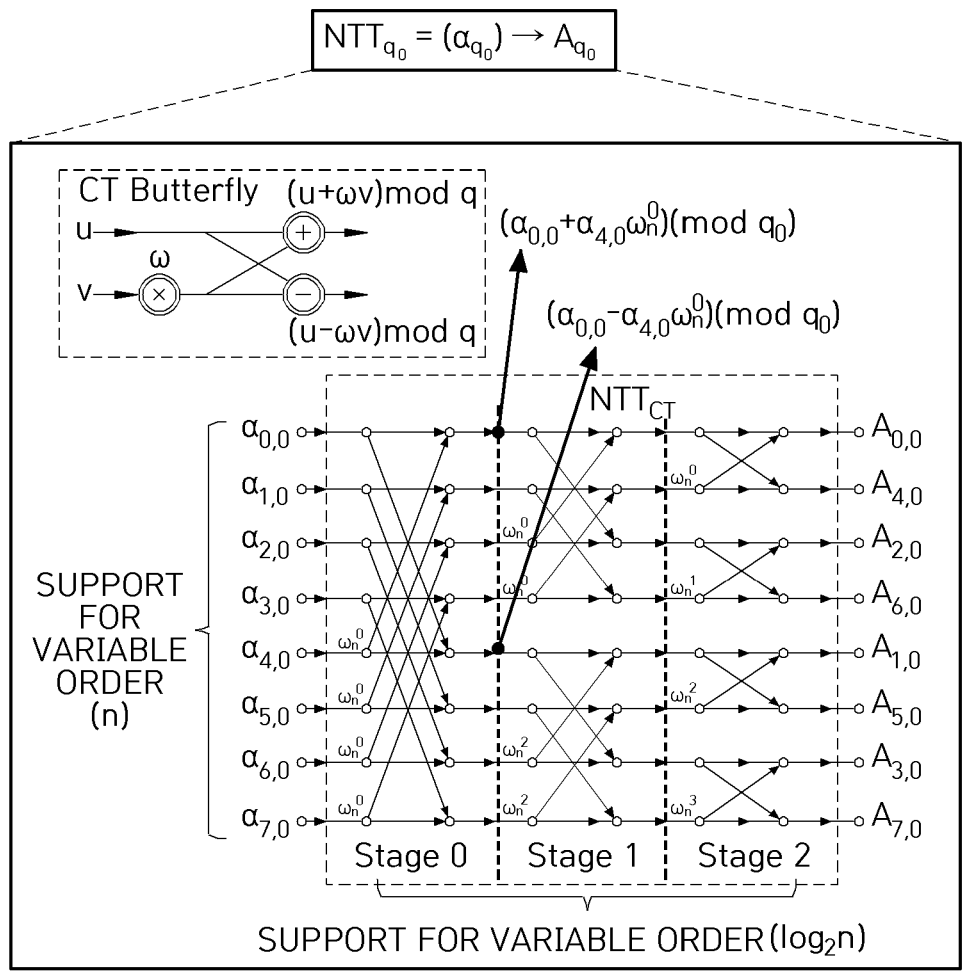

Operation S140 will be described below in detail with reference to FIGS. 2E and 2F. In the present embodiment, a Gentleman-Sande (GS) butterfly operation is used for the INTT transformation. FIG. 2F illustrates a process in which two output values (u+w*v, u−w*v) are calculated through the CT butterfly operation process when two input values u and v are given. However, since the corresponding NTT transformation is performed on the ring polynomial composed of the modulus q, the modulus operation by q (i.e., mod q) is performed on two output values. FIG. 2F illustrates that the INTT transformation is performed after inputting each component $(C_{0,0}, C_{1,0}, \ldots, \text{or } C_{7,0})$ of the result value $C_{q0}$ of the pointwise multiplication operation corresponding to $q_0$ to the GS butterfly and INTT when it is assumed that n=8. In the INTT transformation process of the result value $C_{q0}$ of the pointwise multiplication operation corresponding to $q_0$, $q_0$ is applied as the modulus. Looking at a part where $c_{0,0}$ (corresponding to u) and $c_{4,0}$ (corresponding to v) are input in stage 0 of the GS butterfly, it can be seen that the result value obtained by performing the modular operation by $q_0$ on $(C_{0,0}+C_{4,0})$ and $(C_{0,0}-C_{4,0})*w$ is an output value of stage 0. In the same way, the output value of stage 0 may be obtained for $(C_{1,0}, C_{5,0})$, $(C_{2,0}, C_{6,0})$, and $(C_{3,0}, C_{7,0})$. When an order n of a polynomial input to the INTT transformation is 8, the INTT transformation is performed through $(\log_2 8)$, that is, three stages (stage 0, stage 1, and stage 2). The divided polynomial $c_{q0}$ with the results $c_{0,0}, c_{1,0}, \ldots, \text{and } c_{7,0}$ of the NTT transformation as coefficients may be obtained. For example, $c_{0,0}$ is a coefficient of a constant term of $c_{q0}$, and $c_{7,0}$ is a coefficient of a $7^{th}$-order term of $c_{q0}$. As described above, the number n of input stages and the number $\log_2 n$ of stages of the GS butterfly operation may be changed according to the order n of the polynomial of the homomorphically encrypted message.

In the same manner as described above, the divided ciphertext ($c_{q0}$, $c_{q1}$, ..., and $c_{qr-1}$) for each disjoint factor may be obtained by performing the INTT transformation on all the result values of the pointwise multiplication operation.

Meanwhile, even when the polynomial order of the homomorphically encrypted message changes, the NTT transformation may be performed by forming the GS butterfly structure accordingly ("support for variable order" in FIG. 2F).

The method of obtaining a twiddle factor is the same as in operation S120.

The twiddle factor is arranged on the GS butterfly according to the INTT algorithm, and is arranged as follows for each stage according to the example of FIG. 2F.
  stage 0: Since $w_n^{-k}$ (k=0,1,2,3), $w_n^{-0}$, $w_n^{-1}$, $w_n^{-2}$, $w_n^{-3}$
  stage 1: Since $w_n^{-2k}$ (k=0,1), $w_n^{-0}$, $w_n^{-2}$
  stage 2: Since $w_n^{-4k}$ (k=0), $w_n^{-0}$ Operation S150 is a ciphertext merging operation. In the present operation, the homomorphically encrypted message modular multiplier generates an output ciphertext by merging the divided ciphertext obtained in operation S140 through an inverse Chinese remainder theorem (ICRT) operation (see FIG. 2E). The CRT expresses a ciphertext (divided ciphertext) by dividing each coefficient using $q_0$ to $q_{r-1}$ divided by q, whereas the ICRT is a process of merging polynomials expressed by division, and performs the process of merging polynomials in a reverse order of the CRT.

Figure 2E:
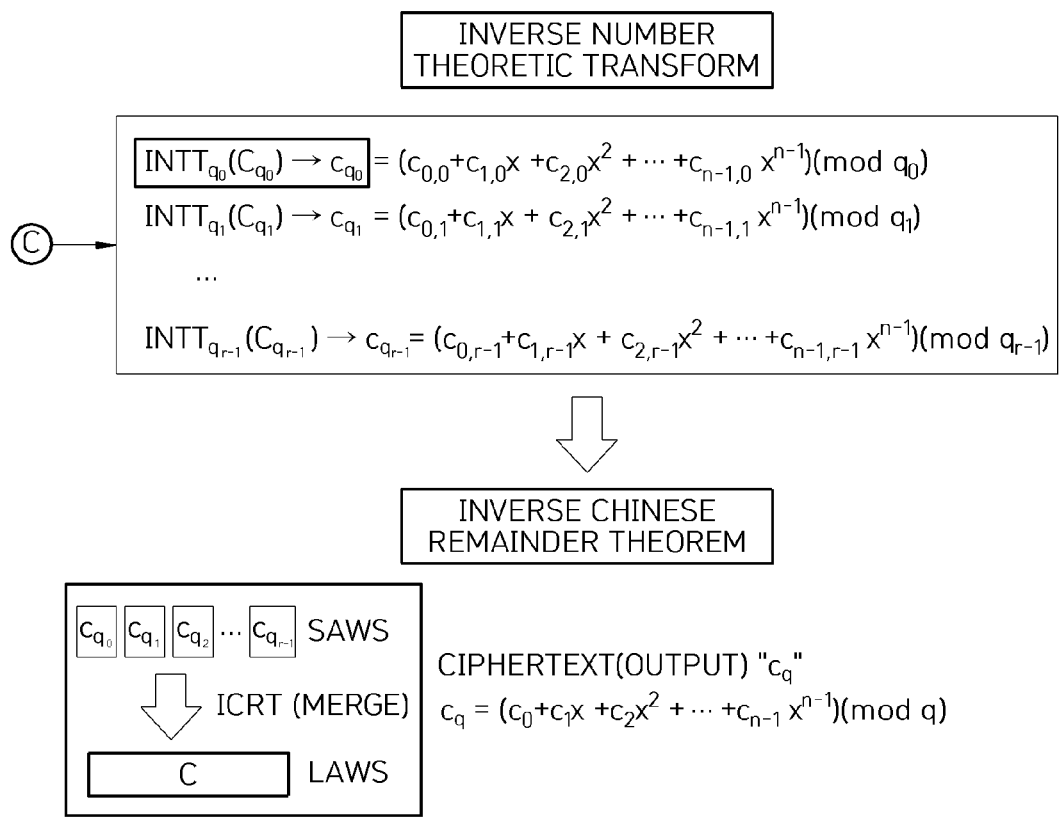
Figure 2F:
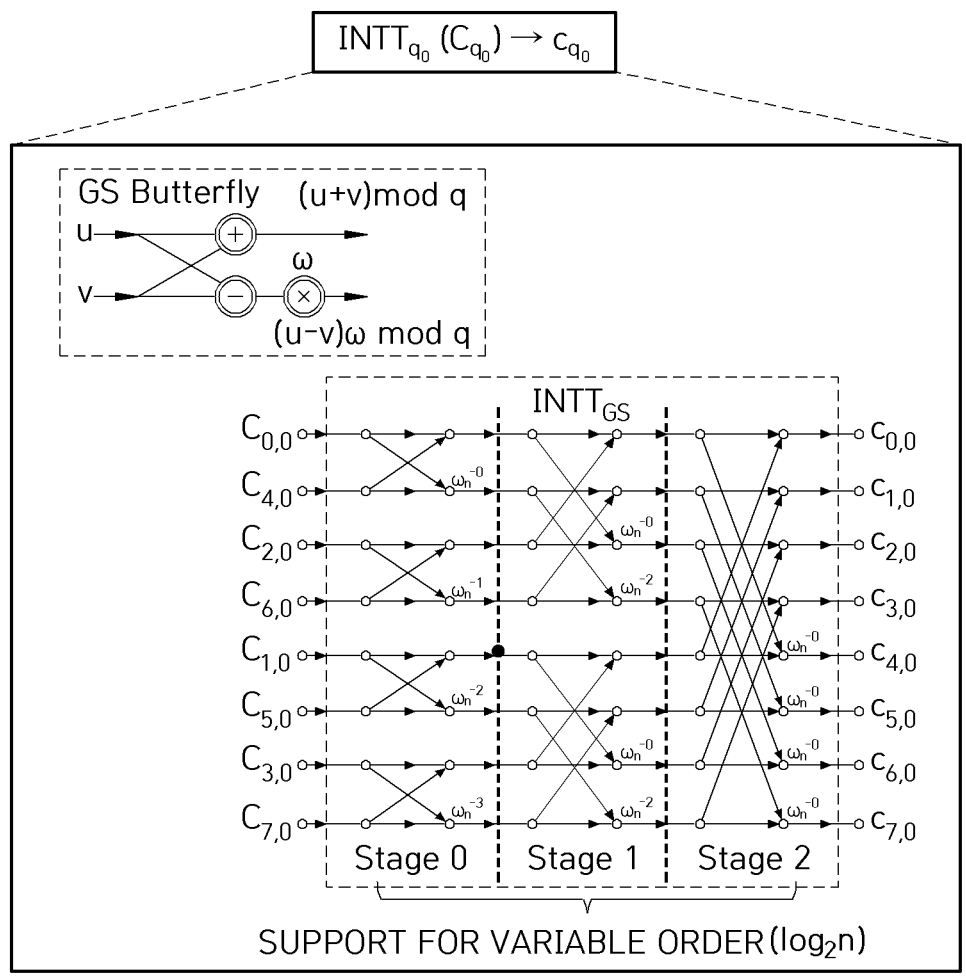

In FIG. 2E, $c_0$ may be represented by ($c_{0,0}*M_0*M_{0-1}+ \ldots + c_{0,r-1}*M_{r-1}*M_{r-1-1}$) (mod q).

Here, $M_i=q/q_i$, and $M_{i-1}$ is a modular multiplication inverse that satisfies $M_i*M_{1-1}$(mod $q_i$)=1.

In the description with reference to FIGS. 1 and 2 (FIGS. 2A to 2F), each operation may be further divided into additional operations or combined into fewer operations according to an implementation example of the present invention. Also, some operations may be omitted if necessary, and an order between the operations may be changed. In addition, even when other contents are omitted, the contents of FIGS. 3 and 4 may be applied to the contents of FIGS. 1 and 2 (FIGS. 2A to 2F). Also, the contents of FIGS. 1 and 2 (FIGS. 2A to 2F) may be applied to the contents of FIGS. 3 and 4.

The above-described method of performing hardware-based modular multiplication on homomorphically encrypted messages has been described with reference to the flowcharts presented in the drawings. For simplicity, the method has been illustrated and described as a series of blocks, but the invention is not limited to the order of the blocks, and some blocks may occur with other blocks in a different order or at the same time as illustrated and described in the present specification. Also, various other branches, flow paths, and orders of blocks that achieve the same or similar result may be implemented. In addition, all the illustrated blocks may be not required for implementation of the methods described in the present specification.

Figure 3:
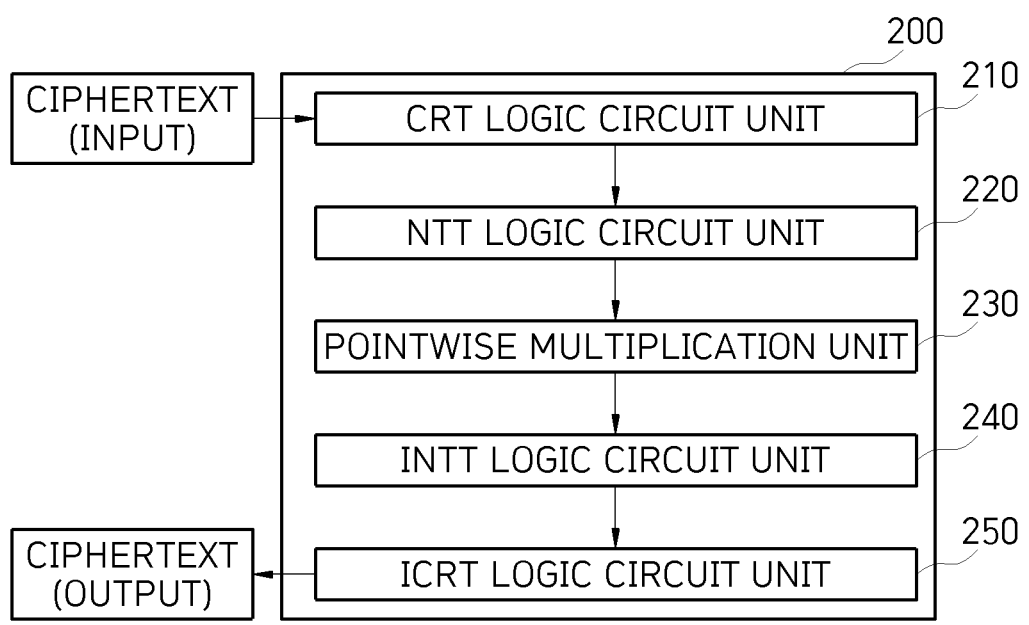
FIG. 3 is a block diagram illustrating a configuration of a homomorphically encrypted message modular multiplier according to a first embodiment of the present invention.

FIG. 3 is a block diagram illustrating a configuration of a homomorphically encrypted message modular multiplier according to a first embodiment of the present invention.

A modular multiplier 200 on homomorphically encrypted messages according to the first embodiment is configured to include a CRT logic circuit unit 210, an NTT logic circuit unit 220, a pointwise multiplication unit 230, an INTT logic circuit unit 240, and an ICRT logic circuit unit 250.

When a word size of a coefficient and modulus of a homomorphically encrypted message input to a homomorphically encrypted message modular multiplier is large or the number of input homomorphically encrypted messages is large, the first embodiment is suitable for processing a modular multiplication operation of the homomorphically encrypted message through a parallel operation at a high speed.

The CRT logic circuit unit 210 receives a plurality of homomorphically encrypted messages expressed in a polynomial form and a modulus for modular multiplication, and decomposes the received modulus through a CRT operation into a product of a plurality of disjoint factors. In addition, the CRT logic circuit unit 210 extracts a divided ciphertext for each homomorphically encrypted message through a modulus operation with each coefficient of the received homomorphically encrypted message as a first operand and the disjoint factor as a second operand. The CRT logic circuit unit 210 extracts the divided ciphertext from each homomorphically encrypted message according to a predetermined order of the disjoint factors decomposed from the modulus.

The CRT logic circuit unit 210 may decompose the received modulus into the disjoint factor corresponding to the set word size by using the CRT operation, and extract a divided ciphertext having a coefficient corresponding to the set word size. The modular multiplier 200 on homomorphically encrypted messages may divide a polynomial having a large coefficient value into polynomials having a coefficient value of a small disjoint factor, and thus, independently process modular operations in parallel.

The CRT logic circuit unit 210 may have a single CRT logic circuit, but may include a plurality of CRT logic circuits. When the CRT logic circuit unit 210 includes a plurality of CRT logic circuits, each CRT logic circuit independently processes a modular operation in parallel to generate the divided ciphertext.

Details of the CRT logic circuit unit 210 may be understood with reference to the contents of the above-described method of performing hardware-based modular multiplication on homomorphically encrypted messages in operation S110 and FIGS. 2A and 2B.

The NTT logic circuit unit 220 performs NTT transformation on the divided ciphertext. That is, the NTT logic circuit unit 220 obtains the result value (function value) of NTT transformation by performing the NTT transformation on the coefficient of the divided ciphertext calculated by the CRT logic circuit unit 210. The NTT logic circuit unit 220 may use the CT butterfly operation to perform the NTT transformation, and may perform the NTT transformation by changing the CT butterfly structure according to the polynomial order of the input homomorphically encrypted message (support for variable order).

The NTT logic circuit unit 220 may have a single CRT logic circuit, but may include a plurality of CRT logic circuits. When the NTT logic circuit unit 220 includes a plurality of NTT logic circuits, each NTT logic circuit independently processes the NTT transformation (operation) in parallel.

Details of the NTT logic circuit unit 220 may be understood with reference to the contents of the above-described method of performing hardware-based modular multiplication on homomorphically encrypted messages in operation S120 and FIGS. 2C and 2D.

The pointwise multiplication unit 230 repeatedly performs the pointwise multiplication operation between the result values of the NTT transformation for all of the plurality of homomorphically encrypted messages. Specifically, the pointwise multiplication unit 230 performs the pointwise multiplication operation between the result values of the NTT transformation of each divided ciphertext of the homomorphically encrypted messages according to the order of extracting the divided ciphertexts (a constant order of the disjoint factors). The pointwise multiplication operation between the result values of each NTT transformation is an operation to obtain a multiplication result between coefficients of the same order for each same-order term (point-wise).

The modular multiplier 200 on homomorphically encrypted messages according to the present invention may process the computational complexity required for the multiplication operation between $n^{th}$-order polynomials with the number of times of multiplications at an O (n log n) level by the NTT transformation and the pointwise multiplication operation.

Details of the pointwise multiplication unit 230 may be understood with reference to the contents of the above-described method of performing hardware-based modular multiplication on homomorphically encrypted messages in operation S130 and FIG. 2C.

The INTT logic circuit unit 240 transforms the final result value of the pointwise multiplication operation obtained by the pointwise multiplication unit 230 into the INTT to obtain the divided ciphertext. The NTT logic circuit unit 240 may use the GS butterfly operation to perform the NTT transformation, and may perform the INTT transformation by changing the GS butterfly structure according to the polynomial order of the input homomorphically encrypted message (support for variable order).

Details of the INTT logic circuit unit 240 may be understood with reference to the contents of the above-described method of performing hardware-based modular multiplication on homomorphically encrypted messages in operation S140 and FIGS. 2E and 2F.

The ICRT logic circuit unit 250 generates the output ciphertext by allowing the INTT logic circuit unit 240 to merge the divided ciphertext, which is obtained through the INTT transformation, through the ICRT operation.

Details of the ICRT logic circuit unit 250 may be understood with reference to the above-described method of performing hardware-based modular multiplication on homomorphically encrypted messages in operation S150 and with reference to FIG. 2E.

Figure 4:
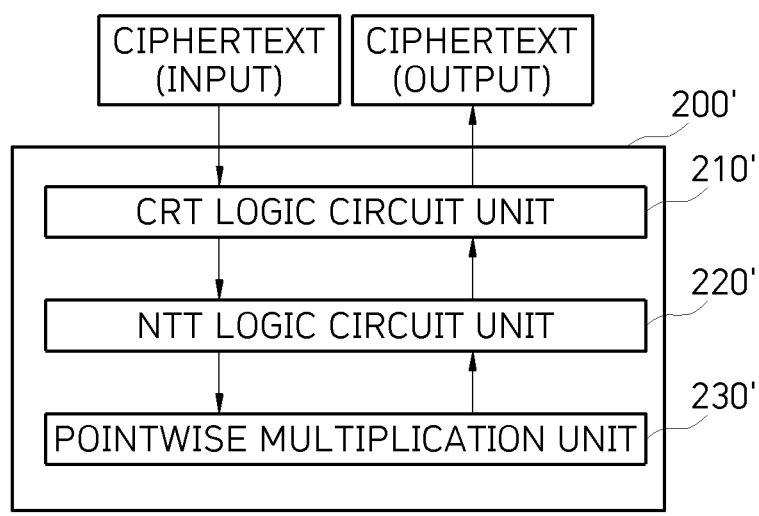
FIG. 4 is a block diagram illustrating a configuration of a homomorphically encrypted message modular multiplier according to a second embodiment of the present invention.

FIG. 4 is a block diagram illustrating a configuration of a homomorphically encrypted message modular multiplier according to a second embodiment of the present invention.

A modular multiplier 200' on homomorphically encrypted messages according to the second embodiment is configured to include a CRT logic circuit unit 210', an NTT logic circuit unit 220', and a pointwise multiplication unit 230'.

The second embodiment is different from the first embodiment in the configuration of the homomorphically encrypted message modular multiplier. The second embodiment may be implemented relatively inexpensively compared to the first embodiment, and is suitable when high parallel operation processing performance is not required (e.g., the number of input homomorphically encrypted messages is two).

The CRT logic circuit unit 210' performs a function of the CRT logic circuit unit 210 as well as a function of the ICRT logic circuit unit 250. That is, the CRT logic circuit unit 210' extracts the divided ciphertext through the CRT operation based on the homomorphically encrypted message, transfers the extracted divided ciphertext to the NTT logic circuit unit 220', and generates an output ciphertext by allowing the NTT logic circuit unit 220' to merge the divided ciphertext, which is obtained through INTT transformation, through an ICRT operation. For example, the CRT logic circuit unit 210' includes a CRT logic circuit and an ICRT logic circuit, and may selectively operate the CRT logic circuit or the ICRT logic circuit as necessary. The CRT logic circuit unit 210' receives a plurality of homomorphically encrypted messages expressed in a polynomial form and a modulus for modular multiplication, decomposes the modulus into a product of a plurality of disjoint factors through the CRT operation, and extracts divided ciphertexts according to a predetermined order of the plurality of disjoint factors for each of the homomorphically encrypted messages by the modulus operation with each coefficient of the homomorphically encrypted message as a first operand and the disjoint factor as a second operand.

The NTT logic circuit unit 220' performs a function of the INTT logic circuit unit 240 as well as a function of the NTT logic circuit unit 220. That is, the NTT logic circuit unit 220' not only performs the NTT transformation on the divided ciphertext of the homomorphically encrypted message to transfer the transformation result (result value of the NTT transformation) to the pointwise multiplication unit 230', but also performs the INTT transformation on the final result value of the pointwise multiplication operation of the pointwise multiplication unit 230' to obtain the divided ciphertext for generating an output ciphertext and transfer the obtained divided ciphertext to the CRT logic circuit unit 210'.

The pointwise multiplication unit 230' performs the same function as the pointwise multiplication unit 230. That is, the pointwise multiplication unit 230' repeatedly performs the pointwise multiplication operation between the result values of the NTT transformation for all of the plurality of homomorphically encrypted messages. Specifically, the pointwise multiplication unit 230' performs the pointwise multiplication operation between the result values of the NTT transformation of each divided ciphertext of the homomorphically encrypted messages according to the order of extracting the divided ciphertexts (a constant order of the disjoint factors). The pointwise multiplication unit 230' transfers the final result value of the pointwise multiplication operation to the NTT logic circuit unit 220'.

Specific details of each component of the homomorphically encrypted message modular multiplier 200' according to the second embodiment may be readily understood by those of ordinary skill in the art to which the present invention pertains based on the description with reference to FIGS. 1 and 2 (FIGS. 2A to 2F) and FIG. 3.

Figure 5:
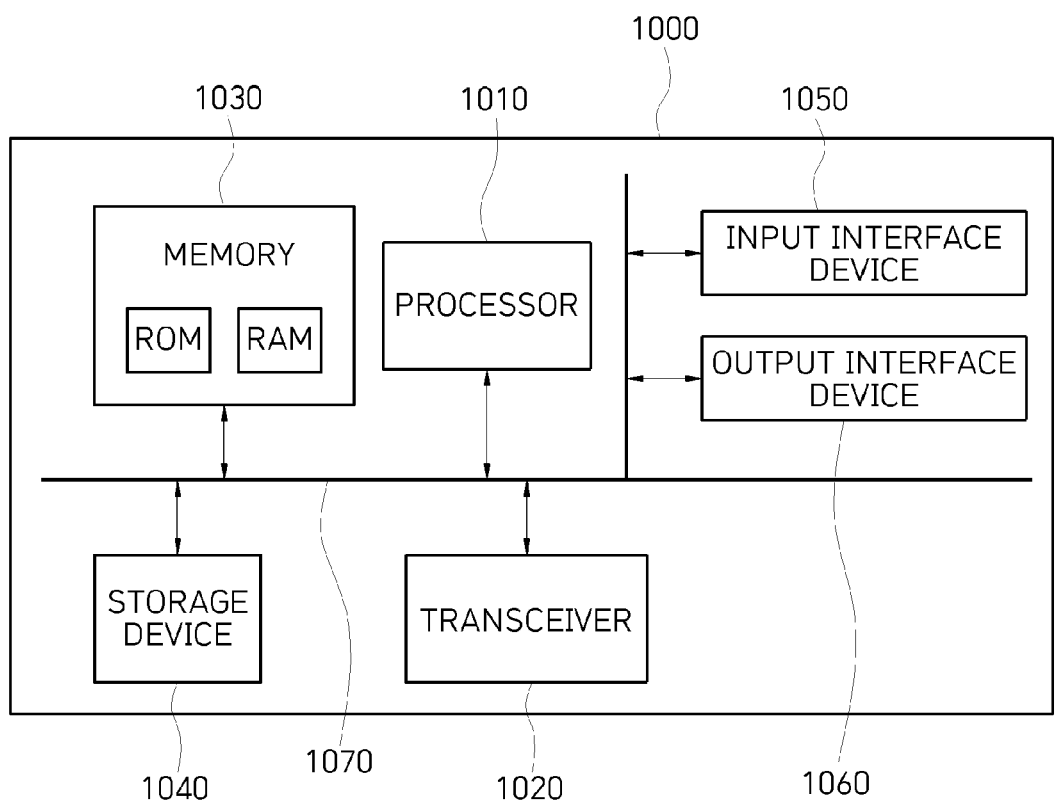
FIG. 5 is a block diagram illustrating a computer system for implementing the method according to the embodiment of the present invention.

FIG. 5 is a block diagram illustrating a computer system for implementing the method according to the embodiment of the present invention.

Referring to FIG. 5, a computer system 1000 may include at least one of a processor 1010, a memory 1030, an input interface device 1050, an output interface device 1060, and a storage device 1040 which communicate via a bus 1070. The computer system 1000 may further include a transceiver 1020 coupled to a network. The processor 1010 may be a central processing unit (CPU) or a semiconductor device that executes instructions stored in the memory 1030 or the storage device 1040. The memory 1030 and the storage device 1040 may include various types of volatile or non-volatile storage media. For example, the memory may include a read only memory (ROM) and a random-access memory (RAM). In the embodiment of the present invention, the memory may be positioned inside or outside the processor, and the memory may be connected to the processor through various known units. The memory may include various types of volatile or non-volatile storage media. For example, the memory may include a ROM or a RAM.

Therefore, the embodiment of the present invention may be implemented as a method implemented in a computer or as a non-transitory computer-readable medium having computer-executable instructions stored therein. In an embodiment, when the computer-executable instructions are executed by the processor, the computer-executable instructions may perform the method according to at least one aspect of the present invention.

The tranceiver 1020 may transmit or receive a wired signal or a wireless signal.

Further, the method according to the embodiment of the present invention may be implemented in the form of program instructions that can be executed through various computer units and recorded on computer readable media.

The computer readable media may include program instructions, data files, data structures, or combinations thereof. The program instructions recorded on the computer readable media may be specially designed and prepared for the embodiments of the invention or may be available well-known instructions for those skilled in the field of computer software. The computer readable media may include a hardware device configured to store and execute program instructions. Examples of the computer readable media include magnetic media such as a hard disk, a floppy disk, and a magnetic tape, optical media such as a compact disc read only memory (CD-ROM) and a digital video disc (DVD), magneto-optical media such as a floptical disk, and a hardware device, such as a ROM, a RAM, or a flash memory, that is specially made to store and perform the program instructions. Examples of the program instruction include machine code generated by a compiler and high-level language code that can be executed in a computer using an interpreter and the like.

For reference, the components according to the embodiment of the present invention may be implemented in the form of hardware, such as a fully homomorphic encryption application specific integrated circuit (ASIC) or the like dedicated to cloud computation, but may also be implemented in a software form.

The term "unit" used in the embodiment of the present invention means hardware components such as ASIC or software, and "unit" performs certain roles. However, the "unit" is not meant to be limited to software or hardware.

According to an embodiment of the present invention, it is possible to process computational complexity with the number of times of multiplications of a 0 (n log n) level only by point-wise multiplication between coefficients of the same order, not by computational complexity of a $O(n^2)$ level required for a multiplication operation between nth-order polynomials, and independently process a modular operation in parallel by dividing a polynomial having a large coefficient value into coefficient values of a small disjoint factor.

Therefore, according to the present invention, it is possible to greatly reduce the number of times of multiplication in homomorphic encryption by an NTT logic circuit operator and a CRT logic circuit operator arranged in parallel, and to process multiplication and modular operations between ciphertexts at high speed by allowing each CRT logic circuit operator to independently perform the modular operation in parallel using values in small units obtained by dividing the modulo operation of large coefficient values.

Effects which can be achieved by the present invention are not limited to the above-mentioned effects. That is, other objects that are not described may be clearly understood by those skilled in the art to which the present invention pertains from the following description.

Although exemplary embodiments of the present invention have been disclosed hereinabove, it may be understood by those skilled in the art that the present invention may be variously modified and altered without departing from the scope and spirit of the present invention described in the following claims.

What is claimed is:

1. A method of performing hardware-based modular multiplication on homomorphically encrypted messages, the method comprising:

performing a ciphertext division operation of receiving a plurality of homomorphically encrypted messages expressed in a polynomial form and a modulus for modular multiplication, decomposing the modulus into a product of a plurality of disjoint factors through a Chinese remainder theorem (CRT) operation, and extracting a divided ciphertext from a plurality of homomorphically encrypted messages based on each of the disjoint factors;

performing number theoretic transform (NTT) transformation on each coefficient of the divided ciphertext;

performing a pointwise multiplication operation between result values of the NTT transformation;

performing inverse number theoretic transform (INTT) transformation on a result value of the pointwise multiplication operation to obtain the divided ciphertext; and merging the divided ciphertext obtained in the performing of the INTT transformation through an inverse Chinese remainder theorem (ICRT) operation to generate an output ciphertext;

wherein the performing of the ciphertext division operation includes decomposing the modulus into a product of disjoint factors less than or equal to a predetermined word size.

2. The method of claim 1, wherein the performing of the ciphertext division operation includes extracting the divided ciphertext from the plurality of homomorphically encrypted messages through a modulus operation with each coefficient of the homomorphically encrypted messages as a first operand and a disjoint factor as a second operand.

3. The method of claim 2, wherein the performing of the ciphertext division operation includes extracting the divided ciphertext by performing the modulus operation after applying a sequence of a same disjoint factor to each of the homomorphically encrypted messages.

4. The method of claim 1, wherein the performing of the NTT transformation includes performing the NTT transformation on each coefficient of the divided ciphertext after inputting each coefficient of the divided ciphertext to a Cooley-Turkey (CT) butterfly.

5. The method of claim 4, wherein the CT butterfly determines a number of input terminals based on a highest order of the homomorphically encrypted messages.

6. The method of claim 4, wherein the CT butterfly determines a number of calculation stages based on a highest order of the homomorphically encrypted messages.

7. The method of claim 1, wherein the performing of the pointwise multiplication operation includes performing a pointwise multiplication operation for each disjoint factor by a same order using result values of all NTT transformation obtained in the performing of the NTT transformation as a target.

8. The method of claim 1, wherein the performing of the NTT transformation includes inputting a result value of the pointwise multiplication operation to a Gentleman-Sande (GS) butterfly to perform the INTT transformation.

9. The method of claim 8, wherein the GS butterfly determines a number of calculation stages based on a highest order of the homomorphically encrypted messages.

10. A homomorphically encrypted message modular multiplier, comprising:
   a Chinese remainder theorem (CRT) logic circuit unit configured to receive a plurality of homomorphically encrypted messages expressed in a polynomial form and a modulus for modular multiplication, decompose the modulus into a product of a plurality of disjoint factors through a CRT operation, and extract a divided ciphertext from the plurality of homomorphically encrypted messages based on each of the disjoint factors;
   a number theoretic transform (NTT) logic circuit unit configured to perform NTT transformation on each coefficient of the divided ciphertext;
   a pointwise multiplication unit configured to perform a pointwise multiplication operation between result values of the NTT transformation;
   an inverse number theoretic transform (INTT) logic circuit unit configured to perform INTT transformation on a result value of the pointwise multiplication operation to obtain the divided ciphertext; and
   an inverse Chinese remainder theorem (ICRT) logic circuit unit configured to merge the divided ciphertext obtained by the INTT transformation through an ICRT operation to generate an output ciphertext;
   wherein the CRT logic circuit unit decomposes the modulus into a product of disjoint factors less than or equal to a predetermined word size.

11. The homomorphically encrypted message modular multiplier of claim 10, wherein the NTT logic circuit unit performs the NTT transformation on each coefficient of the divided ciphertext after inputting each coefficient of the divided ciphertext to a Cooley-Turkey (CT) butterfly.

12. The homomorphically encrypted message modular multiplier of claim 11, wherein the CT butterfly determines a number of input terminals based on a highest order of the homomorphically encrypted messages.

13. The homomorphically encrypted message modular multiplier of claim 11, wherein the CT butterfly determines a number of calculation stages based on a highest order of the homomorphically encrypted messages.

14. The homomorphically encrypted message modular multiplier of claim 10, wherein the pointwise multiplication unit performs a pointwise multiplication operation for each disjoint factor by a same order using result values of all NTT transformation derived from the plurality of homomorphically encrypted messages as a target.

15. The homomorphically encrypted message modular multiplier of claim 10, wherein the INTT logic circuit unit inputs a result value of the pointwise multiplication operation to a Gentleman-Sande (GS) butterfly to perform the INTT transformation.

16. The homomorphically encrypted message modular multiplier of claim 15, wherein the GS butterfly determines a number of calculation stages based on a highest order of the homomorphically encrypted messages.

17. A homomorphically encrypted message modular multiplier, comprising:
   a Chinese remainder theorem (CRT) logic circuit unit configured to receive a plurality of homomorphically encrypted messages expressed in a polynomial form and a modulus for modular multiplication, decompose the modulus into a product of a plurality of disjoint factors through a CRT operation, and extract a divided ciphertext from the plurality of homomorphically encrypted messages based on each of the disjoint factors;
   a number theoretic transform (NTT) logic circuit unit configured to perform NTT transformation on each coefficient of the divided ciphertext; and
   a pointwise multiplication unit configured to perform a pointwise multiplication operation between result values of the NTT transformation,
   wherein the NTT logic circuit unit performs inverse number theoretic transform (INTT) transformation on result values of the pointwise multiplication operation to obtain the divided ciphertext, and
   the CRT logic circuit unit merges the divided ciphertext obtained by the INTT transformation through an inverse Chinese remainder theorem (ICRT) operation to generate an output ciphertext; and
   wherein the CRT logic circuit unit decomposes the modulus into a product of disjoint factors less than or equal to a predetermined word size.

* * * * *